United States Patent
Yagi et al.

(10) Patent No.: US 8,471,213 B2
(45) Date of Patent: Jun. 25, 2013

(54) IMAGE PICKUP APPARATUS AND IMAGE PICKUP SYSTEM

(75) Inventors: Tomoyuki Yagi, Honjo (JP); Tadao Endo, Honjo (JP); Toshio Kameshima, Kumagaya (JP); Masayoshi Akiyama, Kumagaya (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 12/637,579

(22) Filed: Dec. 14, 2009

(65) Prior Publication Data

US 2010/0155614 A1   Jun. 24, 2010

(30) Foreign Application Priority Data

Dec. 19, 2008 (JP) ................................. 2008-324473

(51) Int. Cl.
*H01L 27/146* (2006.01)

(52) U.S. Cl.
USPC .................................................... 250/370.09

(58) Field of Classification Search
None
See application file for complete search history.

(56) References Cited

U.S. PATENT DOCUMENTS

| | | | | |
|---|---|---|---|---|
| 5,140,445 | A  * | 8/1992  | Takashima et al. | 348/244 |
| 6,803,553 | B1 * | 10/2004 | Tian | 250/208.1 |
| 7,079,189 | B2 * | 7/2006  | Tsujii et al. | 348/372 |
| 7,109,491 | B2 * | 9/2006  | Shinden | 250/370.09 |
| 7,462,834 | B2 * | 12/2008 | Masazumi | 250/370.09 |
| 7,626,628 | B2 * | 12/2009 | Muraoka et al. | 348/308 |
| 2002/0044211 | A1 | 4/2002 | Tujii et al. | |
| 2006/0169907 | A1 | 8/2006 | Shinden | |
| 2010/0213350 | A1 * | 8/2010 | Shikanai | 250/208.1 |

FOREIGN PATENT DOCUMENTS

| | | |
|---|---|---|
| JP | 2005-118348 A | 5/2005 |
| JP | 2009-300261 A | 12/2009 |

\* cited by examiner

*Primary Examiner* — David Porta
*Assistant Examiner* — Edwin Gunberg
(74) *Attorney, Agent, or Firm* — Canon U.S.A., Inc. IP Division

(57) ABSTRACT

An apparatus includes a detecting unit having pixels that converts radiation or light to electric signals; a drive circuit that drives the detecting unit; a read circuit that outputs the electric signals as image signals; a power supply unit that supplies voltages to the detecting unit, the drive circuit, and the read circuit; and a control unit that controls at least the drive circuit and the power supply unit. The control unit performs a first process of stopping the voltage supply operation to the detecting unit, with the voltage supply operations to the drive circuit and the read circuit maintained; a second process of driving the detecting unit; and a third process of stopping the voltage supply operations to the drive circuit and the read circuit.

15 Claims, 12 Drawing Sheets

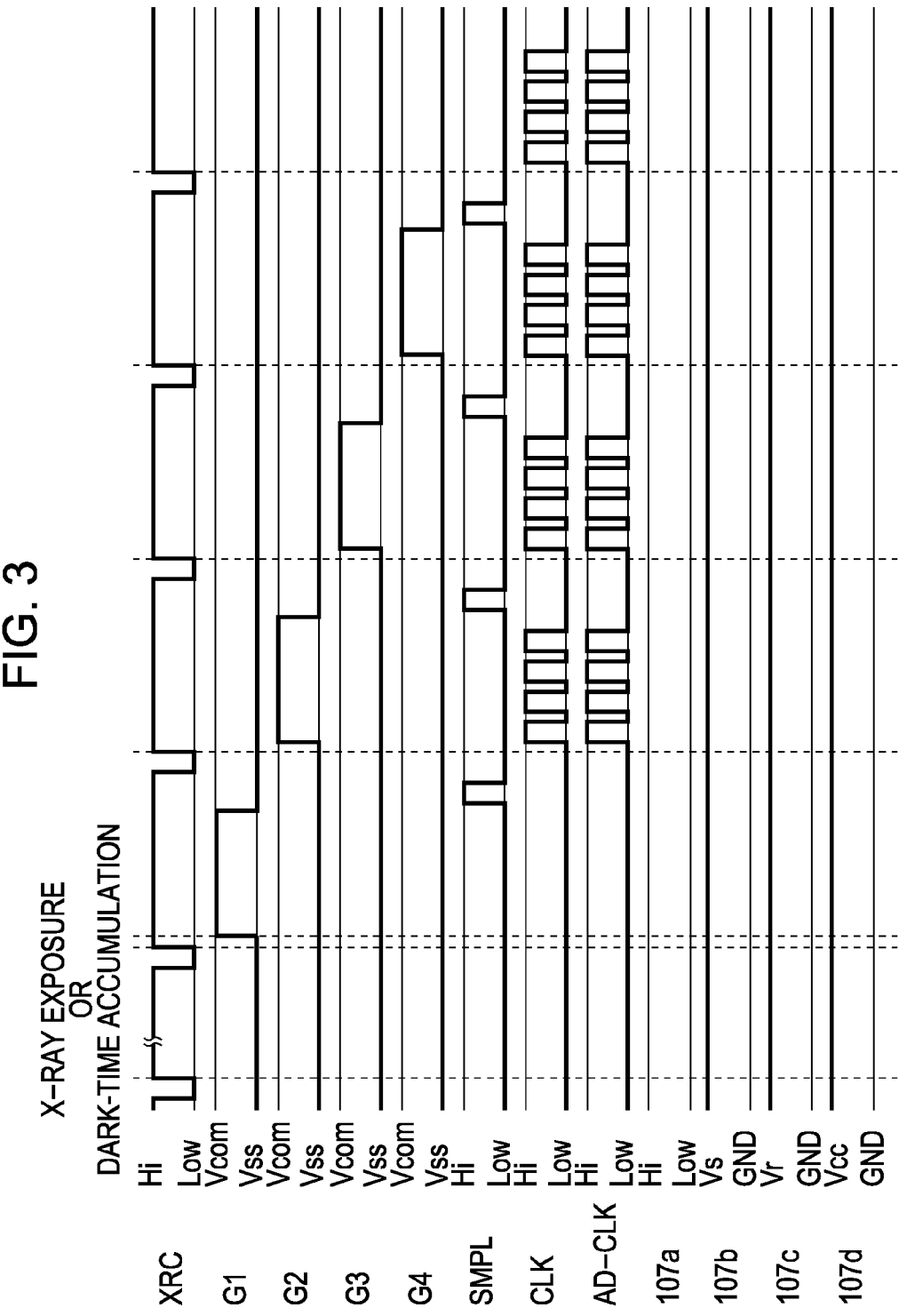

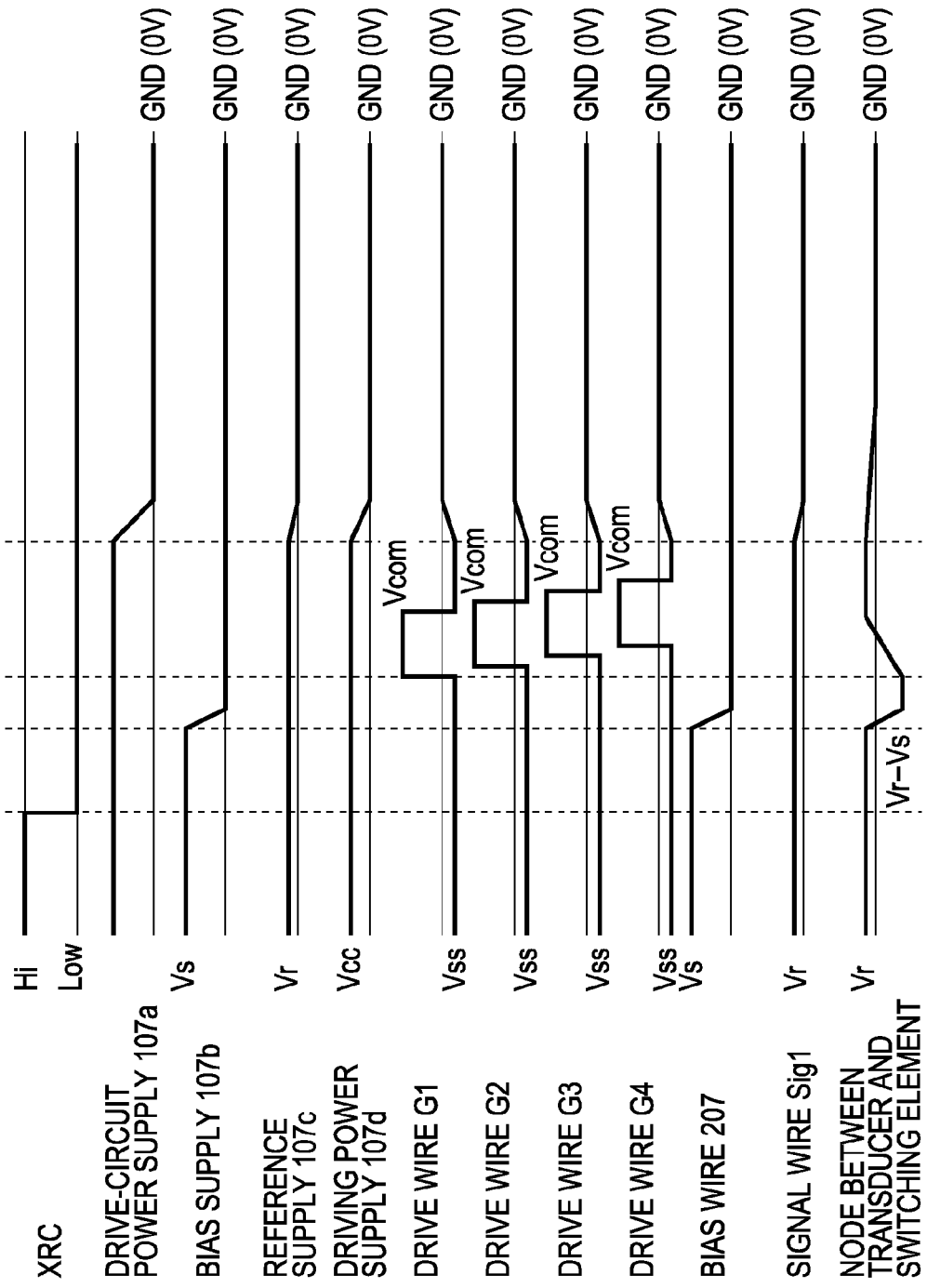

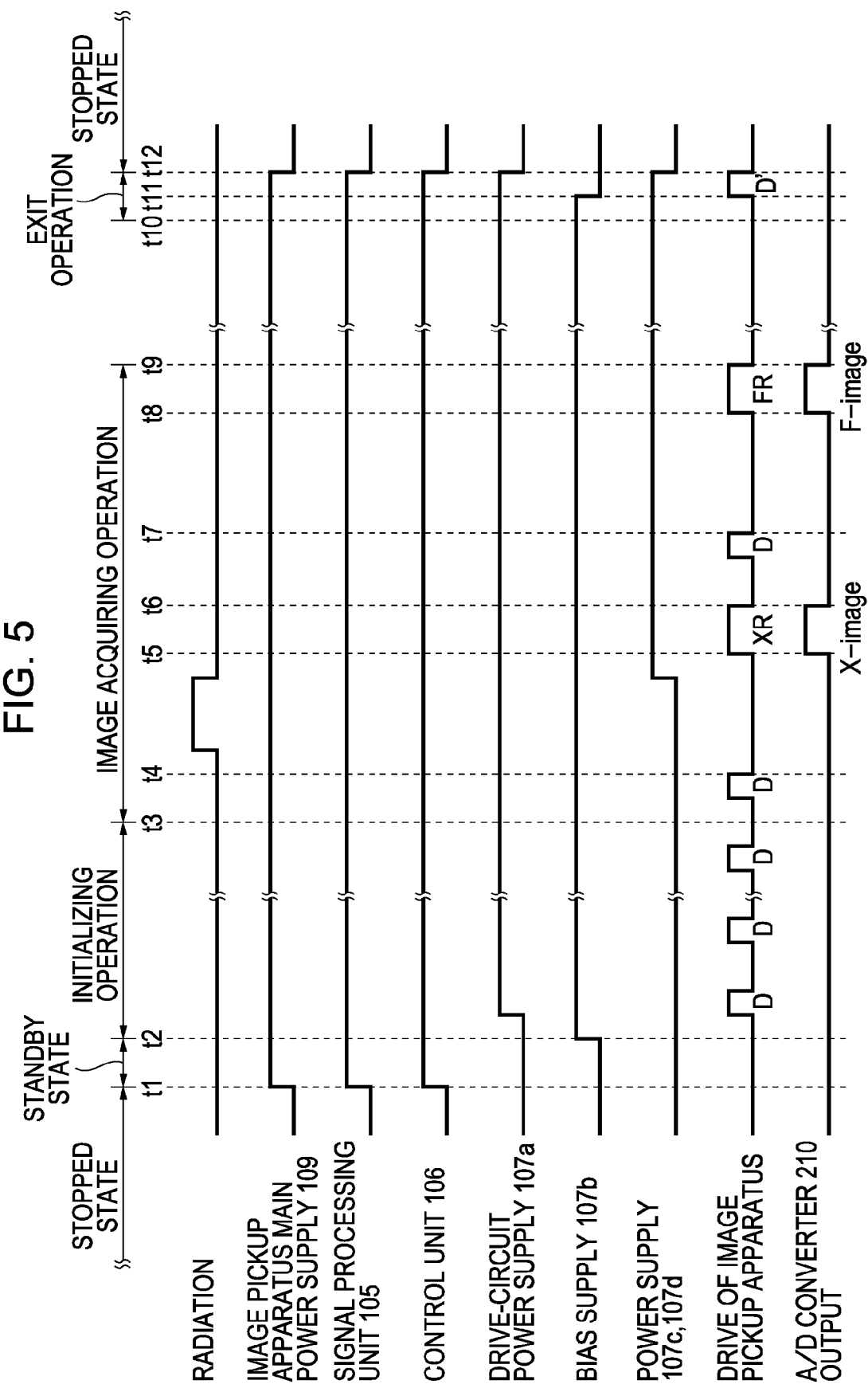

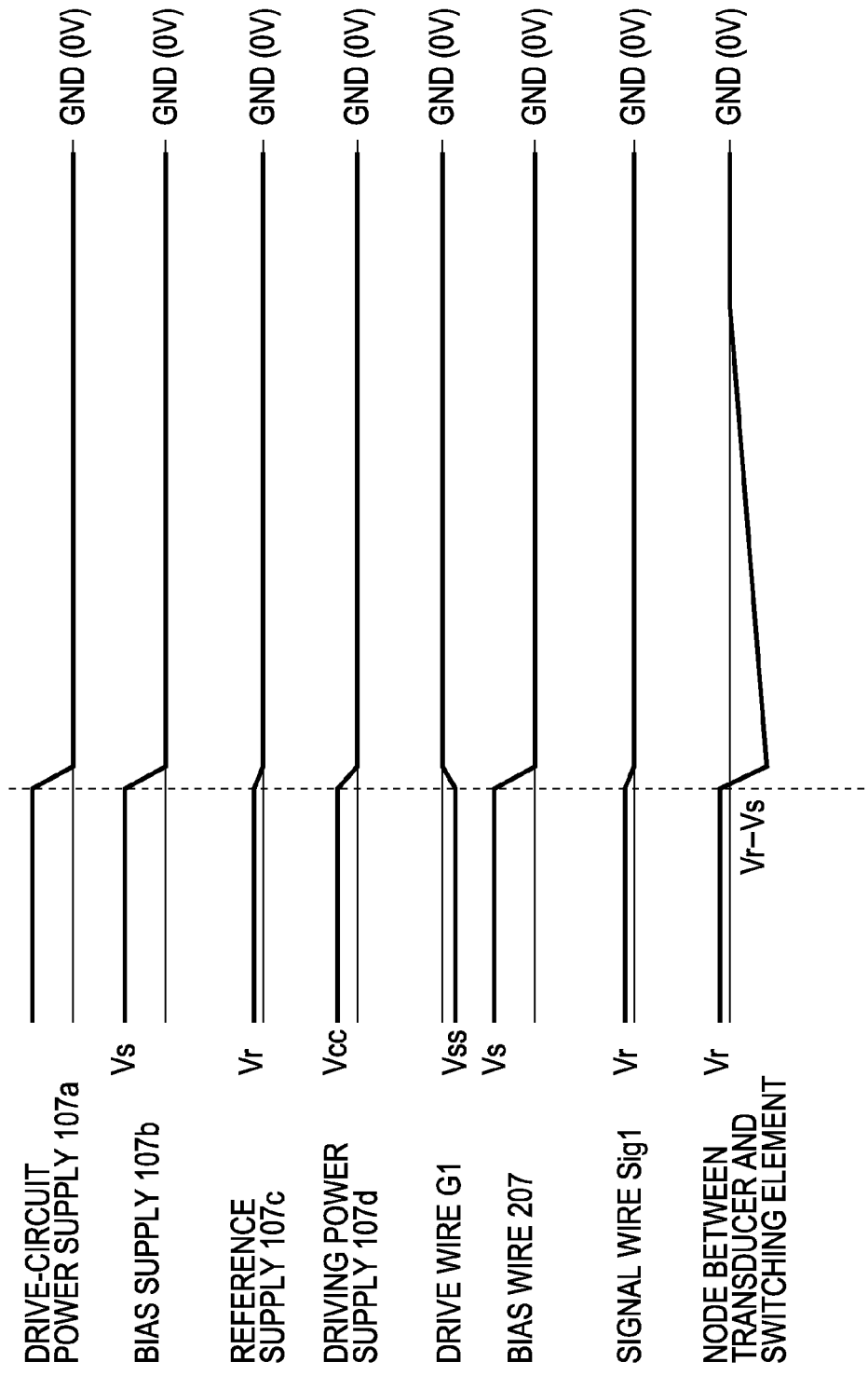

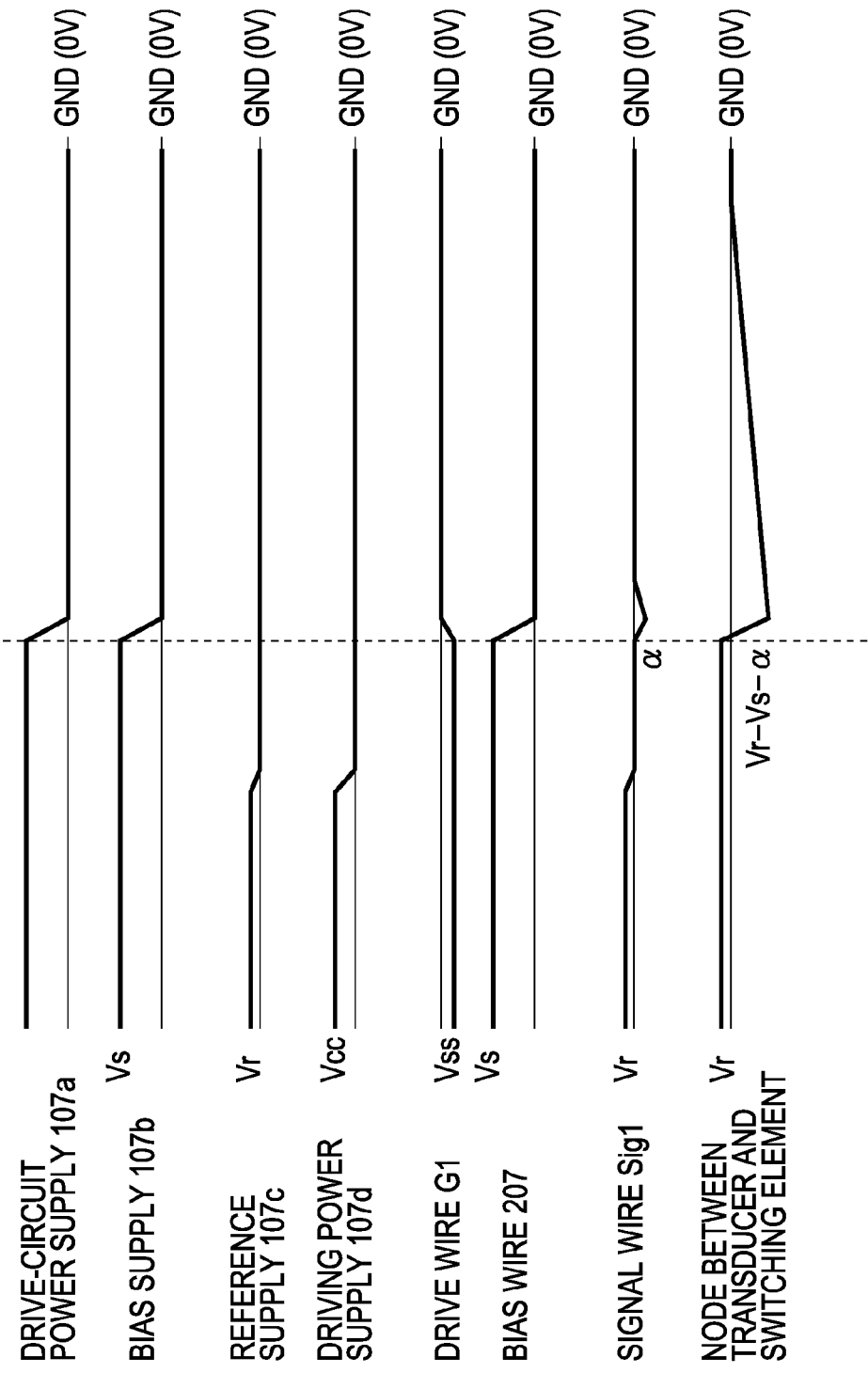

IMAGE PICKUP APPARATUS AND IMAGE PICKUP SYSTEM

BACKGROUND OF THE INVENTION

1. Field of the Invention

The present invention relates to an image pickup apparatus, a radiation image-pickup apparatus, and a radiation image-pickup system. More specifically, the invention relates to an image pickup apparatus for use in a radiation image-pickup apparatus and a radiation image-pickup system.

2. Description of the Related Art

In recent years, a radiation image-pickup apparatus including a flat panel detector (hereinafter abbreviated to an FPD) formed of a semiconductor material is coming into practical use as an image pickup apparatus for use in radiographic medical diagnostic imaging and nondestructive examination. The pixels of the FPD each include at least a transducer that converts radiation or light to electrical charge and a switching element that outputs an electric signal corresponding to the electrical charge generated by the transducer. Such an FPD is provided with a drive circuit that drives a plurality of pixels and a read circuit that reads the electric signals output from the plurality of pixels. The image pickup apparatus including the above FPD is provided with a signal processing unit that processes the image signals from the read circuit and transmits the image signals to the exterior or receives control signals from the exterior; a power supply unit that applies various biases to the plurality of pixels, the drive circuit, and the read circuit; and a control unit that controls the various components according to the control signals. For example, in a medical image diagnosis, such an image pickup apparatus is used as a digital image pickup apparatus for still-image acquisition, such as common image acquisition, and moving-image acquisition, such as radiation image pickup apparatus. For this image pickup apparatus, various configurations have been proposed, for example, a configuration in which the supply of voltage to the power supply unit, the transmission of control signals to the control unit, and the transmission of image signals from the signal processing unit are performed using cables and a configuration in which supply voltage is supplied to the power supply unit from a battery or the like and the transmission and reception of the control signals and the image signals are performed by radio. For either configuration, various measures have been taken in view of increasing the life of the FPD and reducing the power consumption of the image pickup apparatus.

In view of the above, US Unexamined Patent publication 2002/0044211 and US Unexamined Patent publication 2006/0169907 disclose a configuration in which a plurality of standby modes including a first standby mode in which the power consumption is lower than an image-acquisition mode and a second standby mode in which the power consumption is lower than that of the first standby mode and the image-acquisition mode and the plurality of standby modes are switched.

However, even if the technology disclosed in US Unexamined Patent publication 2002/0044211 and US Unexamined Patent publication 2006/0169907 is executed, the life of the FPD or the image pickup apparatus can be affected when power supply to the FPD is stopped into the standby state, as in the above-described standby mode, or power supply to the entire image pickup apparatus is stopped into a stopped state. When the FPD or the image pickup apparatus enters the standby state or the stopped state, there is a risk of causing degradation of the characteristic of the pixels due to long-time application of voltage to the transducers and the switching elements and fluctuations in the characteristic of the read circuit due to excessive electrical charge flowing to the read circuit.

SUMMARY OF THE INVENTION

An apparatus according to an aspect of the present invention includes a detecting unit having a plurality of pixels that converts radiation or light to electric signals; a drive circuit configured to drive the detecting unit; a read circuit configured to output the electric signals as image signals; a power supply unit configured to perform voltage supply operations to supply voltages to the detecting unit, the drive circuit, and the read circuit; and a control unit configured to control at least the drive circuit and the power supply unit. The control unit performs a first process of stopping the voltage supply operation to the detecting unit, with the voltage supply operations to the drive circuit and the read circuit maintained; a second process of driving the detecting unit using the power supply unit and the drive circuit after the first process; and a third process of stopping the voltage supply operations to the drive circuit and the read circuit after the second process.

Further features of the present invention will become apparent from the following description of exemplary embodiments with reference to the attached drawings.

BRIEF DESCRIPTION OF THE DRAWINGS

FIG. 3 is a timing chart for explaining the image-signal output operation of the image pickup apparatus according to the first embodiment of the present invention.

FIG. 4B is a timing chart for explaining a method for controlling the image pickup apparatus according to the first embodiment of the present invention.

FIG. 5 is a timing chart for explaining the state and the operation of the image pickup apparatus according to the first embodiment of the present invention.

FIG. 10A is a timing chart for explaining the operation of an image pickup apparatus according to a comparative example.

FIG. 10B is a timing chart for explaining the operation of an image pickup apparatus according to a comparative example.

DESCRIPTION OF THE EMBODIMENTS

Embodiments of the present invention will be described hereinbelow with reference to the drawings.

Figure 1:
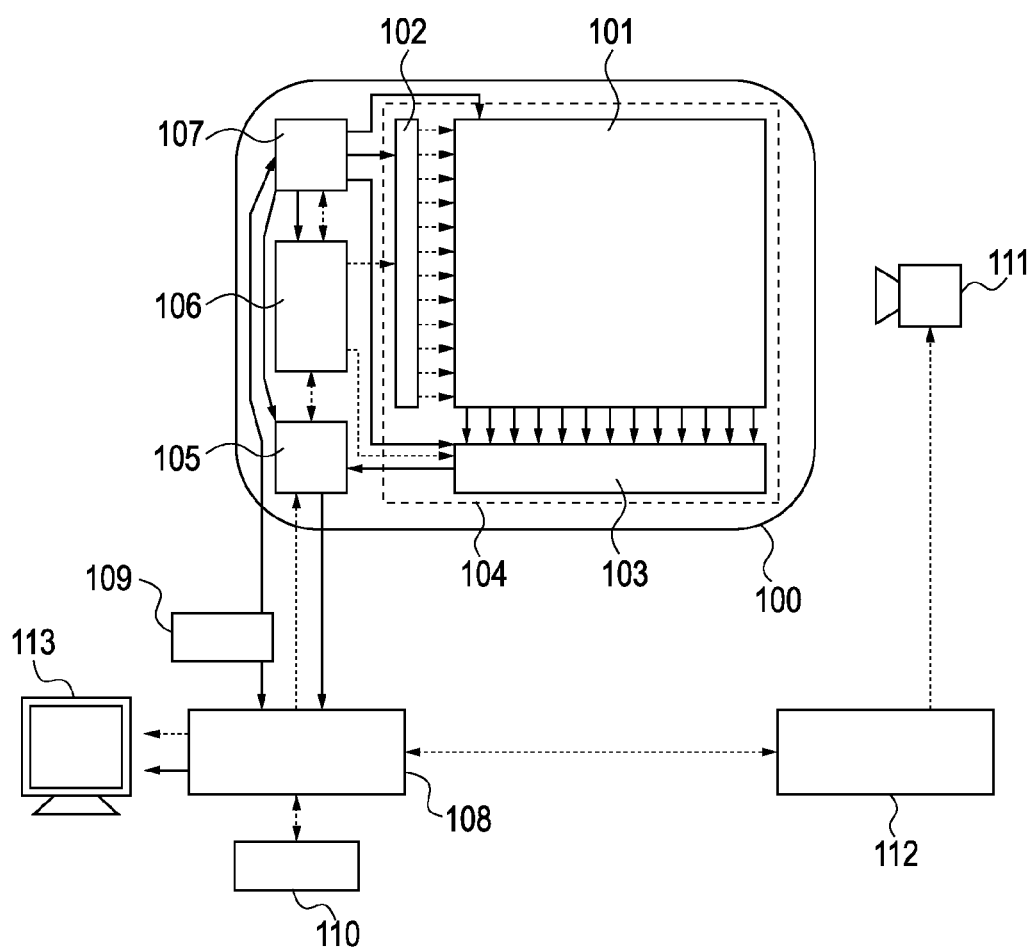
FIG. 1 is a block diagram of an image pickup system including an image pickup apparatus according to a first embodiment of the present invention.

FIG. 1 is a conceptual block diagram of an image pickup system including an image pickup apparatus according to a first embodiment of the present invention. The radiation image-pickup system of this embodiment includes an image pickup apparatus 100, a radiation generator 111, a radiation-generator controller 112, a control computer 108, a console 110, and a display 113. The image pickup apparatus 100 includes a flat panel detector (FPD) 104 including a detecting unit 101 having a plurality of pixels that converts radiation or light to electric signals, a drive circuit 102 that drives the detecting unit 101, and a read circuit 103 that outputs the electric signals received from the driven detecting unit 101 as image signals. The image pickup apparatus 100 further includes a signal processing unit 105 that processes the image signals and output the signals, a control unit 106 that supplies control signals to the individual components to control the components, and a power supply unit 107 that supplies bias voltage to the components. The signal processing unit 105 receives control signals from the control computer 108, to be described later, and provides the control signals to the control unit 106. The power supply unit 107 incorporates a power circuit, such as a regulator, that receives voltage from an external power supply 109, to be described below, and supplies voltage for the detecting unit 101, the drive circuit 102, and the read circuit 103.

The control computer 108 performs synchronization of the radiation generator 111 and the image pickup apparatus 100, transmission of control signals to determine the state of the image pickup apparatus 100, and image processing of the image signals from the image pickup apparatus 100 for correction, storage, and display. The radiation-generator controller 112 receives a control signal from the control computer 108 to control the operation of emitting radiation from the radiation generator 111. The console 110 receives information of a subject and image-acquisition conditions as parameters for the various control of the control computer 108 and transmits them to the control computer 108. The display 113 displays the image signal processed by the control computer 108.

Figure 2:
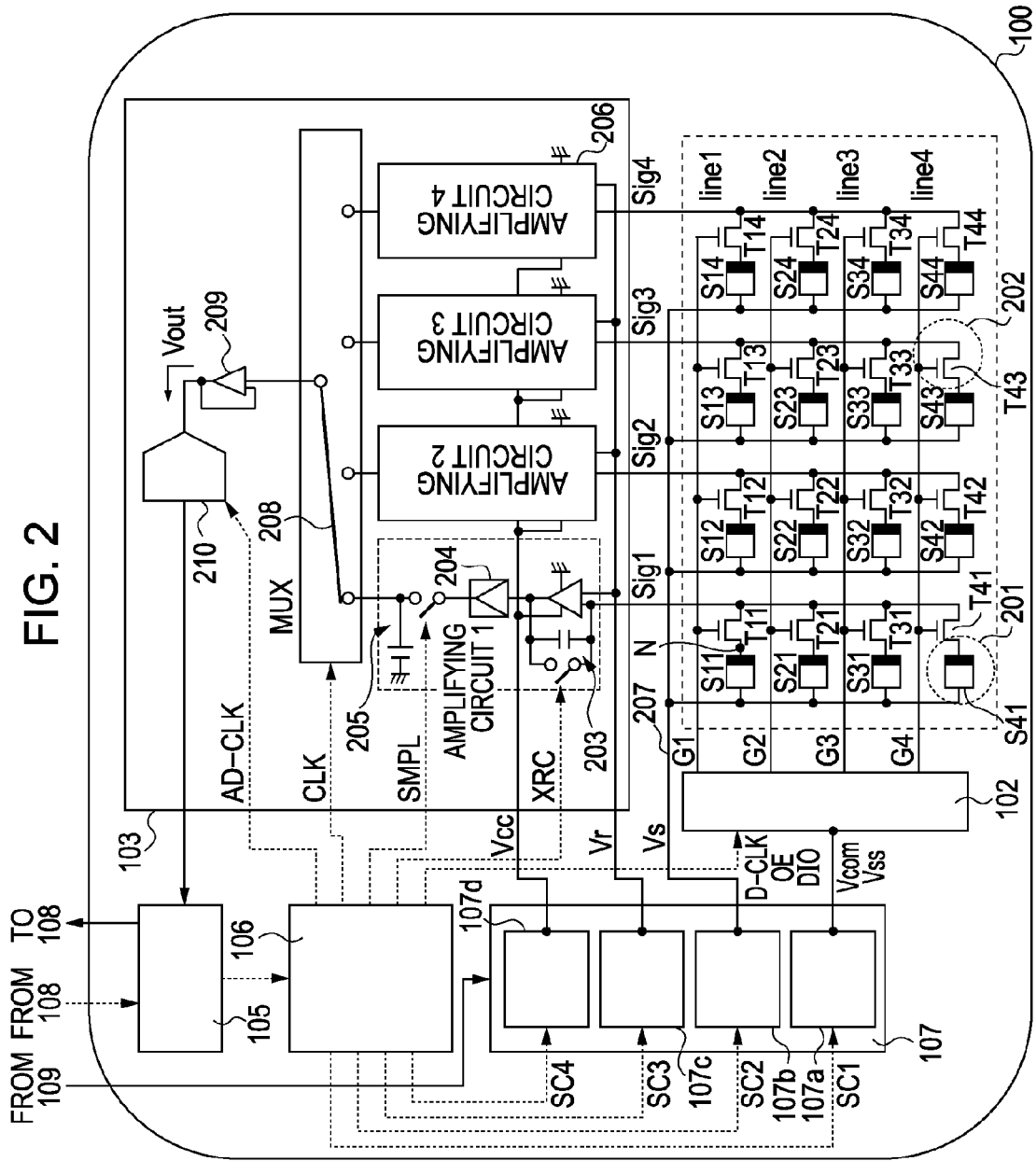
FIG. 2 is a block diagram of the image pickup apparatus including an equivalent circuit of an FPD according to the first embodiment.

FIG. 2 is a conceptual block diagram of the image pickup apparatus 100 including an equivalent circuit of the FPD according to the first embodiment of the present invention. Components with the same configurations as those described in FIG. 1 are given the same reference numerals and detailed descriptions thereof will be omitted. FIG. 2 shows an image pickup apparatus including an FPD having 4-by-4 matrix pixels for illustrative purpose. However, an actual image pickup apparatus has more pixels; for example, a 9-inch image pickup apparatus has about 100-by-100 pixels, and a 17-inch image pickup apparatus has about 2800-by-2800 pixels.

The detecting unit 101 has a plurality of pixels disposed in a matrix form. The pixels each include a transducer 201 that converts radiation or light to electrical charge and a switching element 202 that outputs an electric signal corresponding to the electrical charge. Examples of the transducer that converts light to electrical charge are a photoelectric transducer disposed on an insulating substrate, such as a glass substrate, and formed of amorphous silicon as the main material, such as a PIN photodiode and a MIS transducer. Examples of the transducer that converts radiation to electrical charge are an indirect transducer in which a wavelength converter that converts radiation to light in a wavelength range that the above-described photoelectric transducer can sense is provided at the radiation incident side of the photoelectric transducer and a direct transducer that directly converts radiation to electrical charge. An example of the switching element 202 is a transistor having a control terminal and two main terminals, and for pixels in which photoelectric transducers are provided on an insulating substrate, a thin film transistor (TFT) is used. One of the electrodes of the transducer 201 is electrically connected to one of the main terminals of the switching element 202, and the other electrode is electrically connected to a bias supply 107b through a common bias wire 207. The control terminals of the switching elements, for example, T11 to T14, of the plurality of pixels in a line direction are electrically connected to a drive wire G1 in the first line in common; thus, driving signals that control the conductive state of the switching elements are supplied from the drive circuit 102 through drive wires on a line-by-line basis. The other main terminal of the switching elements, for example, T11 to T41, of the plurality of pixels in a column direction are electrically connected to a signal wire Sig1 in the first column; thus, in a conductive state, electric signals corresponding to the electrical charge of the transducers 201 are output to the read circuit 103 through signal wires. Signal wires Sig1 to Sig4 arrayed in a column direction transmit electric signals output from the pixels of the detecting unit 101 to the read circuit 103 in parallel.

The read circuit 103 is provided with amplifying circuits 206, for the individual signal wires, that amplify the electric signals output in parallel from the detecting unit 101 for each signal wire. The amplifying circuits 206 each include an integrating amplifier 203 that amplifies the output electric signal, a variable gain amplifier 204 that amplifies the electric signal from the integrating amplifier 203, and a sample and hold circuit 205 for sampling and holding the electric signal from the variable gain amplifier 204. The integrating amplifier 203 includes an operational amplifier that amplifies the read electric signal and outputs it, an integral capacitance, and a reset switch that resets the integral capacitance. The integrating amplifier 203 can change the amplification factor by changing the value of the integral capacitance. The output electric signal is input to an inverting input terminal of the operational amplifier; a reference voltage Vr is input to a forward input terminal from a reference supply 107c; and the amplified electric signal is output from an output terminal. The integral capacitance is disposed between the inverting input terminal and the output terminal of the operational amplifier. The sample and hold circuit 205 is provided for each of the amplifying circuits 206 and is constituted of a sampling switch and a sampling capacitance. The read circuit 103 further includes a multiplexer 208 that receives the electric signals read from the individual amplifying circuits 206 in parallel and outputs them as a serial image signal and a buffer amplifier 209 that converts the impedance of the image signal and outputs it. An image signal Vout that is the analog electric signal output from the buffer amplifier 209 is converted to a digital image signal by an analog-to-digital converter 210 and is output to the signal processing unit 105. The image signal processed by the signal processing unit 105 is output to the control computer 108.

The drive circuit 102 outputs a driving signal having a conducting voltage Vcom that brings the switching elements 202 into a conductive state and a driving signal having a non-conducting voltage Vss that brings the switching elements 202 into a non-conductive state to the drive wires in response to a control signal (D-CLK, OE, or DIO) input from the control unit 106. Thus, the drive circuit 102 controls the conduction state of the switching elements 202 to drive the detecting unit 101.

The power supply unit 107 includes a drive-circuit power supply 107a, a bias supply 107b, a reference supply 107c for the amplifying circuits 206, and a driving power supply 107d for the amplifying circuits 206. The drive-circuit power supply 107a supplies the conducting voltage Vcom and the non-conducting voltage Vss to the drive circuit 102. The bias supply 107b supplies a bias voltage Vs in common to the other electrodes of the transducers 201 through the bias wire 207. The reference supply 107c supplies the reference voltage Vr in common to the forward input terminals of the operational amplifiers in the individual amplifying circuits 206. The driving power supply 107d supplies a driving voltage Vcc for driving the operational amplifiers in the amplifying circuits 206 in common to the amplifying circuits 206.

The control unit 106 receives control signals from the control computer 108 etc. outside the image pickup apparatus 100 via the signal processing unit 105 and controls the operation of the drive circuit 102, the power supply unit 107, and the read circuit 103 by giving the controls signals thereto. The control unit 106 controls the operation of the drive circuit 102 by giving the control signal D-CLK, the control signal OE, and the control signal DIO to the drive circuit 102. Here, the control signal D-CLK is a shift clock of a shift register used as the drive circuit 102; the control signal DIO is a pulse that the shift register transfers; and the control signal OE controls the output terminal of the shift register.

The control unit 106 further controls the operation of the components of the read circuit 103 by giving a control signal XRC, a control signal SMPL, a control signal CLK, and a control signal AD-CLK to the read circuit 103. Here, the control signal XRC controls the operation of the reset switches of the integrating amplifiers 203, and the control signal SMPL controls the operation of the sample and hold circuit 205. The control signal CLK controls the operation of the multiplexer 208, and the control signal AD-CLK controls the operation of the analog-to-digital converter 210.

The control unit 106 further controls the voltage supply operation of the drive-circuit power supply 107a that supplies a conducting voltage or a non-conducting voltage by giving a control signal SC1 to the drive-circuit power supply 107a. When the voltage supply operation of the drive-circuit power supply 107a is stopped in response to the control signal SC1, the voltage supplied from the drive-circuit power supply 107a through the drive circuit 102 and the potentials of the drive wires drop toward a ground potential (hereinafter referred to as a GND potential). The control unit 106 further controls the voltage supply operation of the bias supply 107b that supplies the bias voltage Vs by giving a control signal SC2 to the bias supply 107b. When the voltage supply operation of the bias supply 107b is stopped in response to the control signal SC2, the voltage supplied from the bias supply 107b and the potentials of the bias wire 207 and the other electrodes of the transducers 201 drop toward the GND potential. The control unit 106 further controls the voltage supply operation of the reference supply 107c that supplies the reference voltage Vr by giving a control signal SC3 to the reference supply 107c. When the voltage supply operation of the reference supply 107c is stopped in response to the control signal SC3, the voltage supplied from the reference supply 107c drops toward the GND potential. The control unit 106 further controls the voltage supply operation of the driving power supply 107d that supplies the driving voltage Vcc by giving a control signal SC4 to the driving power supply 107d. When the voltage supply operation of the driving power supply 107d is stopped in response to the control signal SC4, the voltage supplied from the driving power supply 107d drops toward the GND potential.

Referring next to FIGS. 2 and 3, an image-signal output operation for one frame by the image pickup apparatus 100 according to the embodiment of the present invention will be described. FIG. 3 is a timing chart for explaining the image-signal output operation of the image pickup apparatus 100 according to the embodiment of the present invention.

First, the control signal XRC in low level is given from the control unit 106 to the reset switches of the integrating amplifiers 203 to bring the reset switches into a conductive state, so that the integral capacitances and the signal wires Sig1 to Sig4 of the integrating amplifiers 203 are reset. Next, the control signal XRC is raised to high level to bring the reset switches into a non-conductive state. Thus, the potentials of the signal wires Sig1 to Sig4 are brought to the reference potential Vr. Next, electrical charge corresponding to the amount of radiation or electrical charge at a dark-time output is accumulated in the transducers 201. At that time, the non-conducting voltage Vss is applied from the drive circuit 102 to the drive wires G1 to G4, so that the switching elements of all the pixels are brought into a non-conductive state.

Next, the control signal XRC in low level is again given from the control unit 106 to the reset switches of the integrating amplifiers 203 to bring the reset switches into a conductive state, so that the integral capacitances and the signal wires Sig1 to Sig4 of the integrating amplifiers 203 are reset just before the image signals are read. Next, the control signal XRC is raised to high level, so that the reset switches are brought into a non-conductive state.

Next, the conducting voltage Vcom is given from the drive circuit 102 to the drive wire G1 in the first line, so that the switching elements T11 to T14 of the pixels in the first line are brought into a conductive state. Thus, electric signals based on the electrical charge generated in the transducers S11 to S14 of the pixels in the first line are output to the individual signal wires Sig1 to Sig4, so that the nodes N between the transducers 201 and the switching elements T11 to T14 come to the reference potential Vr. The electric signals output in parallel through the signal wires Sig1 to Sig4 are individually amplified by the operational amplifiers 203 and the variable gain amplifiers 204 of the amplifying circuits 206. The amplified electric signals are held in parallel in the sample and hold circuits 205 in the individual amplifying circuits 206 that are operated in response to the control signal SMPL from the control unit 106. After the electric signals are held, the integral capacitances and the signal wires Sig1 to Sig4 of the integrating amplifiers 203 are reset in response to the control signal XRC from the control unit 106. After the integral capacitances and the signal wires Sig1 to Sig4 have been reset, the conducting voltage Vcom is applied to the drive wire G2 in the second line, as in the first line, so that the switching elements T21 to T24 of the pixels in the second line are brought into a conductive state.

While the switching elements T21 to T24 of the pixels in the second line are in the conductive state, the control signal CLK is given from the control unit 106 to the multiplexer 208, so that the electric signals held in the sample and hold circuit 205 are output in sequence. Thus, the electric signals read in parallel are output in the form of a serial image signal, which is then converted to one line of digital image signals by the analog-to-digital converter 210 in response to the control signal AD-CLK that is output thereto from the control unit 106.

The above operation is performed to the first to fourth lines in a line-by-line basis, so that one frame of digital image signals is output from the image pickup apparatus 100. When such an image pickup apparatus 100 performs an output operation, the power supply unit 107 supplies voltages to the FPD 104 including at least the detecting unit 101, the drive circuit 102, and the read circuit 103 so that the FPD 104 can output image signals.

While the present invention is achieved by the control of the control unit 106, to be described later, comparative examples in which the control unit 106 does not perform the control of the invention will be described with reference to FIGS. 2, 10A, and 10B to describe the features of the invention. FIGS. 10A and 10B are timing charts for explaining the operations of an image pickup apparatus of the comparative example. FIGS. 10A and 10B show operations after the operation shown in FIG. 3 is completed.

In a first comparative example shown in FIG. 10A, we consider a case in which all the power supplies 107a to 107c stop supply of voltages substantially at the same time. Supposed examples of this case include a standby state in which supply of voltages from the power supply unit 107 to the detecting unit 101, the drive circuit 102, and the read circuit 103 is stopped and a stopped state in which supply of voltage to the power supply unit 107 is stopped so that supply of voltage to the entire image pickup apparatus 100 is stopped. Other examples are a state in which cables connected to the system main body and the image pickup apparatus 100 can be put in and out during power-on and an abnormal stop state in which a portable image pickup apparatus with a built-in battery or the like (cassette image pickup apparatus) is suddenly turned off.

Since the driving signal given to the switching elements 202 of the pixels is also set to 0 V lower than a threshold, the pixels are in a non-conductive state; thus, the nodes N between the transducers 201 and the switching elements 202 are in a floating state at the reference potential Vr. When supply of voltages is stopped substantially at the same time in this state, the voltage supplied from the bias supply 107b drops from a bias voltage Vs to the GND potential, 0 V. Together therewith, the potential of the bias wire 207 drops from the bias voltage Vs to 0 V, and the potentials of the nodes N changes from Vr to Vr−Vs due to the internal capacitances of the transducers 201. At that time, the potentials of the signal wires Sig1 to Sig4 are decreased to substantially the GND potential due to the stop of the power supply of the reference supply 107c and the driving power supply 107d; thus, a voltage of Vr−Vs is applied between the two main electrodes of each switching element 202 and between the electrodes of each transducer 201. The potentials of the nodes N decrease due to long-time natural discharge, during which, however, the transducers 201 and the switching elements 202 are carrying voltage. Therefore, in the first comparative example, there is a risk of degradation of the characteristics of the transducers 201 and the switching elements 202 due to long-time application of voltage thereto. In particular, for FPDs having switching elements formed of a non-single crystal semiconductor are provided on an insulating substrate, the resistance of the switching elements in a non-conducting state is high, so that it takes a long time for natural discharge, thereby increasing the possibility of degradation of the characteristics.

In a second comparative example shown in FIG. 10B, we consider a case in which the reference supply 107c and the driving power supply 107d stop supply of voltages to thereby stop the read circuit 103, and thereafter, the drive-circuit power supply 107a and the bias supply 107b stop supply of voltages.

Since the driving signal given to the switching elements 202 of the pixels is the non-conducting voltage Vss, the pixels are in a non-conductive state; thus, the nodes N between the transducers 201 and the switching elements 202 are in a floating state at the reference potential Vr. When supply of the voltages is stopped substantially at the same time in this state, the voltage supplied from the bias supply 107b drops from the bias voltage Vs to the GND potential, 0 V. The voltage supplied from the drive-circuit power supply 107a changes to the non-conducting voltage Vcc. Thus, the potentials of the signal wires Sig1 to Sig4 change from the GND potential by a predetermined potential α, so that the potential α is applied to the inverting input terminals of the individual integrating amplifiers 203. The potential α cannot be quantified because it depends on the parasitic capacitance etc. of the signal wires Sig1 to Sig4; however, application of such potential α to the inverting input terminals of the integrating amplifiers 203 in a stopped state can cause a risk of the degradation of the characteristics of the integrating amplifiers 203. If some of the switching elements 202 of the pixels have high leakage, there is a possibility that a potential fluctuating component caused by changes in the potentials of the bias wire and the drive wire will be applied to the inverting input terminals of the integrating amplifiers 203. In particular, in an image pickup apparatus for use in a radiation image-pickup system, integrating amplifiers etc. are used to reduce noise in view of low radiation dosage; therefore, the number of protective circuits that cause noise are minimized. This remarkably increases the possibility of degradation of the characteristics of the integrating amplifiers.

Figure 4A:
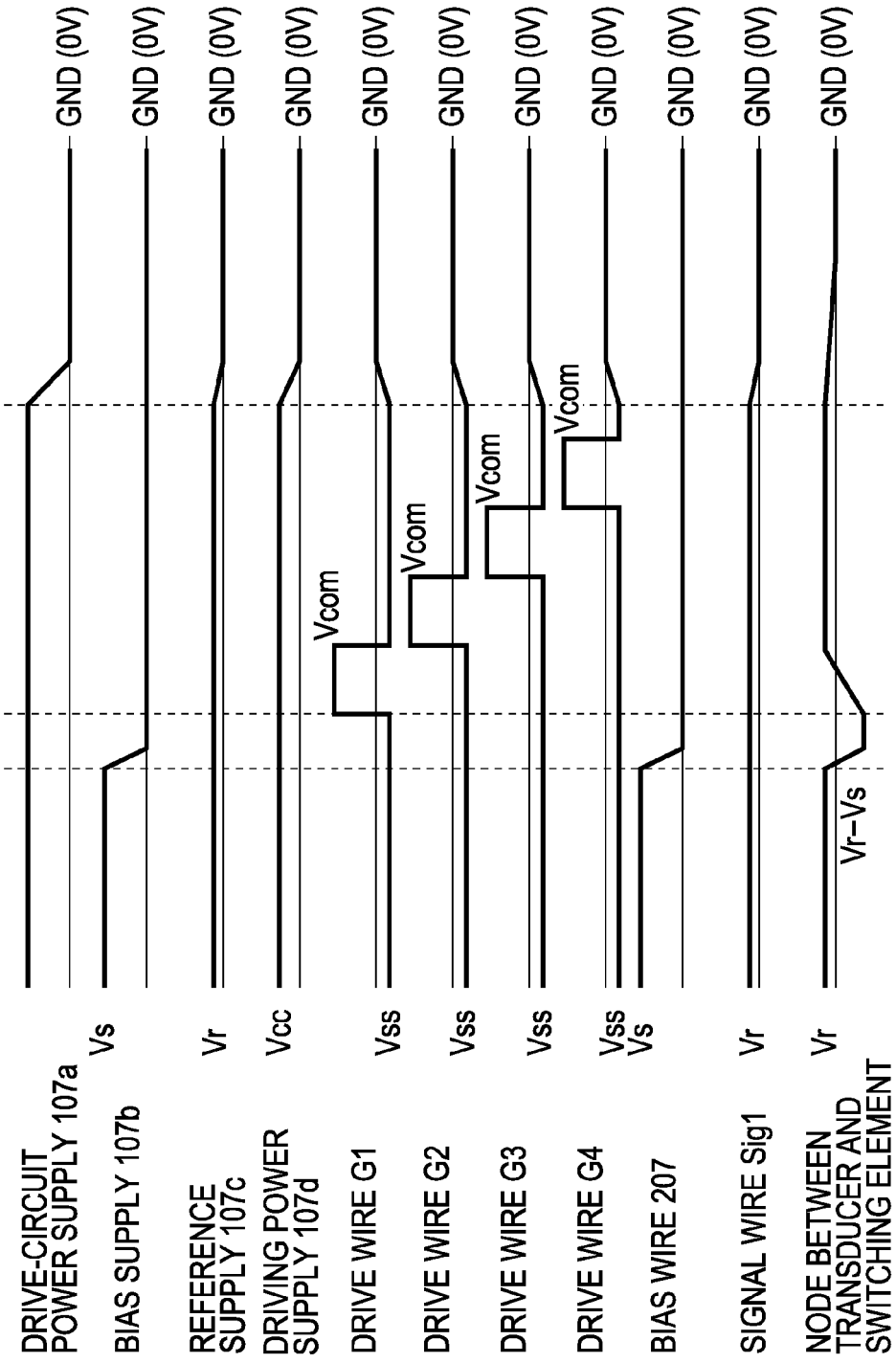
FIG. 4A is a timing chart for explaining a method for controlling the image pickup apparatus according to the first embodiment of the present invention.

Thus, in the present invention, the control unit 106 performs the control below to reduce the degradation of the characteristics of the pixels and the read circuit 103. The control will be described in detail with reference to FIGS. 2, 4A, and 4B. FIGS. 4A and 4B are timing charts for explaining a method for controlling the image pickup apparatus 100 by the control unit 106 according to the first embodiment of the present invention.

The difference between the embodiment shown in FIGS. 4A and 4B and the comparative examples will be described below. First, the control unit 106 gives the control signal SC2 to the bias supply 107b to perform a first process for stopping the voltage supply operation of the bias supply 107b, with the voltage supply operations of the drive-circuit power supply 107a, the reference supply 107c, and the driving power supply 107d maintained. In the first process, the potentials of the nodes N change from Vr to Vr−Vs due to the internal capacitances of the transducers 201, as in the first comparative example. Before the first process, the signal wires Sig1 to Sig4 are brought to a reset state using the reset switches, that is, to the reference potential Vr. Secondly, the control unit 106 gives the control signal SC1 to the drive-circuit power supply 107a and gives control signals to the drive circuit 102, with the voltage supply operation of the bias supply 107b stopped and the voltage supply operations of the reference supply 107c and the driving power supply 107d maintained. After the first process, the control unit 106 performs a second process to make the drive-circuit power supply 107a and the drive circuit 102 drive the detecting unit 101 in response to the control signals. Thus, the potentials of the nodes N are returned from Vr−Vs to the reference potential Vr, so that the potentials between the main electrodes of the switching elements 202 are brought to the same potential, and only the potential Vr that is lower than Vr−Vs in the first comparative example is applied between the electrodes of the transducers 201. At that time, the integrating amplifiers 203 of the read circuit 103 are normally operated; therefore, even if electric signals are output to the integrating amplifiers 203 through the signal wires Sig1 to Sig4, the read circuit 103 is not affected, as in the second comparative example. Thirdly, after the second process, the control unit 106 gives the control signal SC1 to the drive-circuit power supply 107a, the control signal SC3 to the reference supply 107c, and the control signal SC4 to the driving power supply 107d, respectively. After the second process, the control unit 106 performs a third process for stopping the voltage supply operations of the drive-circuit power supply 107a, the reference supply 107c, and the driving power supply 107d. That is, in the present invention, the control unit 106 performs the first to third processes to bring the image pickup apparatus 100 into a standby state or a stopped state. This allows the FPD 104 and the image pickup apparatus 100 to be brought from a state in which they can output image signals to a standby state or a stopped state by reducing voltage applied to the transducers 201 and the switching elements 202. While the reference voltage Vr is applied to the transducers 201, the reference voltage Vr is generally lower than the bias voltage Vs, thus having a low possibility of degrading the characteristics of the transducers 201. The voltage Vr applied to the transducers 201 is lower than the voltage Vr–Vs in the first comparative examples, the voltage Vr can be naturally discharged in a shorter time than the first comparative example. Furthermore, the second process is performed while the read circuit 103 operates normally. This allows an exit operation to bring the FPD 104 and the image pickup apparatus 100 from a state in which the image signals can be output to a standby state or a stopped state without affecting the characteristics of the read circuit 103.

In the form shown in FIG. 4A, the control unit 106 controls the drive circuit 102 so that driving signals are given from the drive circuit 102 in such a manner that the conducting voltages of the driving signals on the drive wires do not coincide with one another. With the form in FIG. 4A, the fluctuating component of the voltage applied to the inverting input terminals of the integrating amplifiers 203 of the read circuit 103 in the second process can be small. However, the second process consumes at least a time obtained by multiplying a conducting-voltage application time per one line by the number of lines. On the other hand, with the form in FIG. 4B, the control unit 106 controls the drive circuit 102 so that driving signals are supplied from the drive circuit 102 to the drive wires G1 to G4 such that the conducting voltages of the driving signals partly coincide with one another. This allows the second process to be performed in a shorter time than in the form in FIG. 4A. However, the fluctuating component of the voltage applied to the inverting input terminals of the integrating amplifiers 203 in the read circuit 103 is larger than that in the form in FIG. 4A by a multiple of lines to which the conducting voltage is applied so as to partially coincide. Therefore, in the form in FIG. 4B, the control unit 106 performs a process to reset the signal wires Sig1 to Sig4 by giving the control signal XRC at low level to the reset switches of the integrating amplifiers 203 before the second process, and may be, before the first process. The control unit 106 then performs a process to maintain the reset switches of the integrating amplifiers 203 in a conducting state and to maintain the signal wires Sig1 to Sig4 in the reset state during the first and the second process. Thus, the potentials of the signal wires Sig1 to Sig4 are fixed at the reference potential Vr, thereby preventing an excessive voltage fluctuating component from being applied to the integrating amplifiers 203. This process is not limited to the form in FIG. 4B and may be applied to the form in FIG. 4A.

Referring next to FIG. 5, the state and the operation of the image pickup apparatus 100 will be described. FIG. 5 is a timing chart for explaining the state and the operation of the image pickup apparatus 100 according to the embodiment of the present invention.

First, at time t1, main power is supplied from the external power supply 109 to the image pickup apparatus 100 in a stopped state, so that voltage is applied to the image pickup apparatus 100. At substantially the same time, voltage is applied also to the signal processing unit 105 and the control unit 106 to bring the image pickup apparatus 100 into a standby state.

Next, at time t2, a control signal is supplied from the control unit 106 to start the operation of the bias supply 107b, so that the bias voltage Vs is applied to the transducers 201 through the bias wire 207. After an elapse of a predetermined time, a control signal is supplied from the control unit 106 to start the operation of the drive-circuit power supply 107a, so that the voltages Vcom and Vss of the driving signals are applied to the drive circuit 102. The control signals D-CLK, OE, and DIO are supplied from the control unit 106 to start the operation of the drive circuit 102, that is, a dummy reading operation D. This dummy reading operation D is an operation that the drive circuit 102 and the detecting unit 101 perform the same operation as the output operation shown in FIG. 3. However, electric signals output from the detecting unit 101 by the dummy reading operation D are not used as image signals. That is, this is an operation for removing the electrical charges in the transducers 201 to stabilize the characteristics of the transducers 201, thereby reinitializing the transducers 201. Therefore, it is enough to merely remove the electrical charges in the transducers 201 by the dummy reading operation D. This decreases the time during which the conducting voltage Vcom of the driving signal is supplied as compared with the image-signal output operation shown in FIG. 3. This dummy reading operation D is repeated multiple times at predetermined time intervals to stabilize the characteristics of the detecting unit 101. This operation is referred to as an initializing operation.

Next, at time t3, the image pickup apparatus 100 receives a control signal from the control computer 108 to shift to an image acquiring operation. The image pickup apparatus 100 first performs the dummy reading operation D one time and maintains the transducers 201 in a state in which the transducers 201 can generate electrical charge based on radiation from time 4 at which the dummy reading operation D has finished to time t5 at which an image-signal output operation is started, to be described later, as a preparation for emitting radiation. This state is referred to as an accumulation state, and the period from time t4 to t5 is referred to as an accumulation period. During the period from the completion of the emission of the radiation to time t5 after an predetermined time, the control unit 106 supplies various control signals to start the operations of the reference supply 107c and the driving power supply 107d, so that the reference voltage Vr and the driving voltage Vcc are applied to the read circuit 103. At time t5, various control signals are supplied from the control unit 106 to the drive circuit 102, the read circuit 103, and the signal processing unit 105, so that the image pickup apparatus 100 performs an image signal X-image output operation XR according to the emission of radiation, shown in FIG. 3. After an elapse of time that is substantially equal to the predetermined time interval in the initializing operation from time t6 at which the output operation XR has finished, the image pickup apparatus 100 performs the dummy reading operation D and maintains the transducers in the accumulation state from time t7 at which the dummy reading operation D finished to time t8, that is, the time substantially equal to the preceding accumulation period. At time t8, the image pickup apparatus 100 performs an image signal F-image output operation FR according to the dark-time output of the transducers 201, as in the preceding output operation XR. The signal processing unit 105 or the control computer 102 performs a correcting process using the image signals X-image and F-image obtained by the image acquiring operation and supplies the corrected image signals for display by the display 113. Performing this image acquiring operation once allows one frame of still image signals to be obtained, and repeating the image acquiring operation a plurality of times allows a plurality of frames of moving-image signals to be obtained. During the image acquiring operation, the image pickup apparatus 100 and the FPD 104 can output image signals.

After completion of the image acquiring operation, at time t10, the control unit 106 receives information, such as control signals for bringing the image pickup apparatus 100 into a standby state or a stopped state. Thus, the image pickup apparatus 100 performs the exit operation, described with reference to FIGS. 4A and 4B, using the control unit 106. Here, symbol D' shown in FIG. 5 denotes the operation in the second process shown in FIG. 4A or 4B, which is referred to as an exit operation. At time t10, the control unit 106 gives a control signal to the bias supply 107b to perform the first process for stopping the voltage supply operation of the bias supply 107b, with the voltage supply operations of the drive-circuit power supply 107a, the reference supply 107c, and the driving power supply 107d maintained. At time t11 after the first process, the control unit 106 provides control signals to the drive-circuit power supply 107a and the drive circuit 102 to perform the second process to make the drive-circuit power supply 107a and the drive circuit 102 drive the detecting unit 101. Thus, the image pickup apparatus 100 performs the exit operation D'. At time t12 after the second process, the control unit 106 supplies control signals to the drive-circuit power supply 107a, the reference supply 107c, and the driving power supply 107d to perform the third process for stopping the voltage supply operations of the drive-circuit power supply 107a, the reference supply 107c, and the driving power supply 107d. The operations of the control unit 106 and the signal processing unit 105 are finished, and the image pickup apparatus 100 comes to a stopped state. Although FIG. 5 describes the form in which the image pickup apparatus 100 shifts to the stopped state by the exit operation D', the present invention is not limited thereto. The control unit 106 can be held in the standby state by maintaining the operations of the control unit 106 and the signal processing unit 105.

Figure 6:
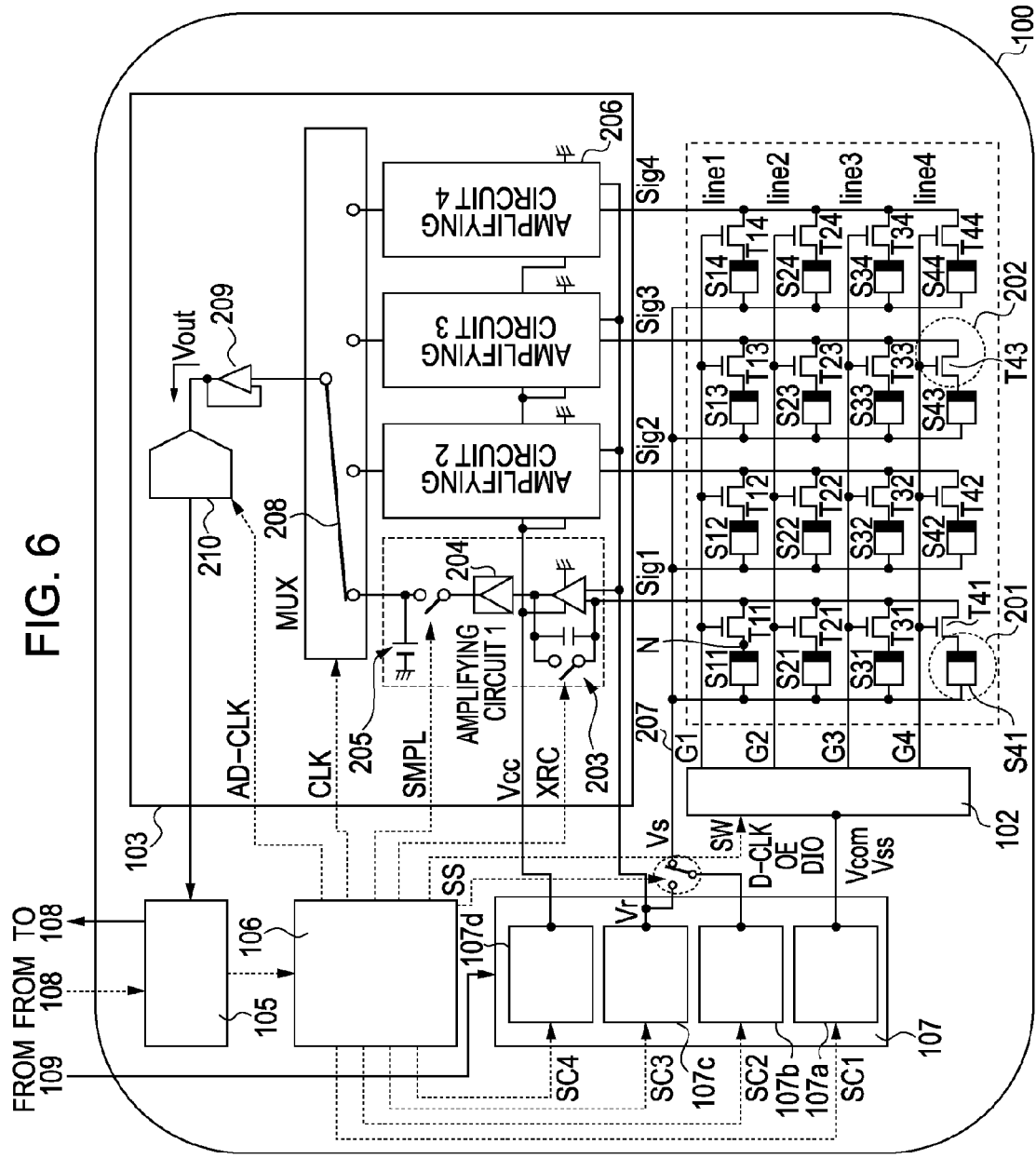
FIG. 6 is a block diagram of an image pickup apparatus including an equivalent circuit of an FPD according to a second embodiment of the present invention.

FIG. 6 is a conceptual block diagram of an image pickup apparatus including an equivalent circuit of an FPD according to a second embodiment of the present invention. Components with the same configurations as those described in FIG. 2 are given the same reference numerals, and detailed descriptions thereof will be omitted. The difference between the first embodiment and the second embodiment is that a switch SW for selecting the electrical connection between the bias wire 207 and the bias supply 107b or the electrical connection between the bias wire 207 and the reference supply 107c is provided and that the control unit 106 gives a control signal SS for controlling the selecting operation of the switch SW.

Figure 7:
FIG. 7 is a timing chart for explaining a method for controlling the image pickup apparatus by a control unit according to the second embodiment.

FIG. 7 is a timing chart for explaining a method for controlling the image pickup apparatus 100 using the control unit 106 of the second embodiment. The difference between the second embodiment shown in FIG. 7 and the first embodiment shown in FIG. 4B will be described below. In this embodiment, in the first process, when the control unit 106 gives the control signal SC2 to the bias supply 107b, the control unit 106 gives the control signal SS to the switch SW. Thus, the control unit 106 controls the switch SW so that the bias wire 207 and the reference supply 107c are electrically connected, and thus, the potential of the bias wire 207 is fixed at the reference voltage Vr in the second process. Therefore, as shown in FIG. 7, the potential of the nodes N becomes Vr as the control unit 106 performs the second process, so that no voltage is applied both between the electrodes of the transducers 201 and between the main electrodes of the switching elements 202. Therefore, a load exerted on the transducers 201 when the FPD 104 and the image pickup apparatus 100 are brought to a standby state or a stopped state can be reduced more than the first embodiment, thereby further reducing the possibility of degrading the characteristics.

Although this embodiment is configured to apply the reference voltage Vr to the bias wire 207 using the reference supply 107c, the invention is not limited thereto; another power supply having the same output voltage as the reference supply may be provided.

Figure 8:
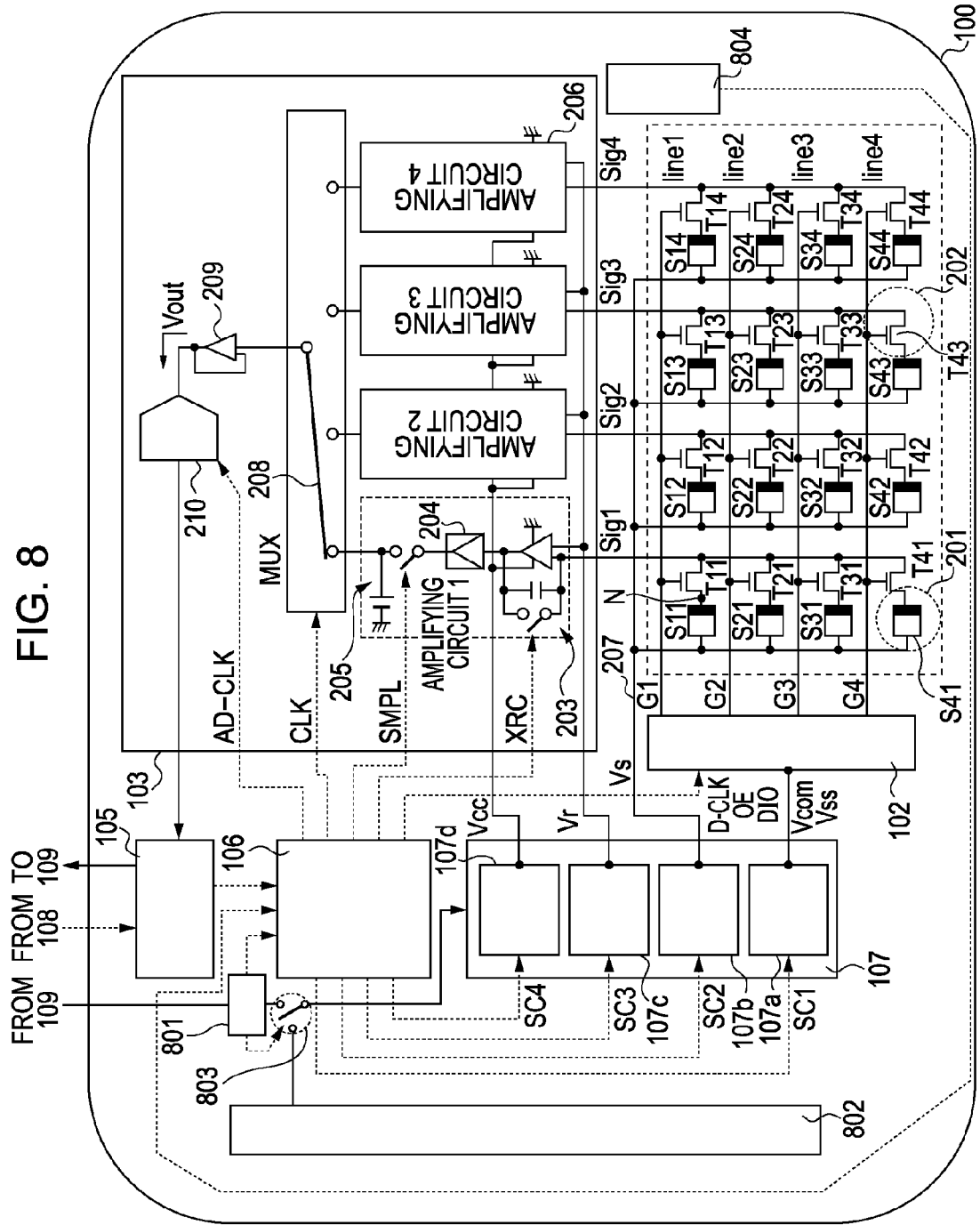
FIG. 8 is a block diagram of an image pickup apparatus including the equivalent circuit of the FPD, according to another example of the present invention.

In the first and second embodiments, while the form in which the control unit 106 performs control on the basis of information, such as control signals, from the control computer 108 via the signal processing unit 105 was described, the present invention is not limited thereto. For example, as shown in FIG. 8, the image pickup apparatus 100 may include a power monitoring unit 801 that monitors voltage supplied from the external power supply 109. If a drop in voltage is detected by the power monitoring unit 701, the power monitoring unit 801 outputs information for the control unit 106 to perform the above-described first to third processes to the control unit 106. If the power monitoring unit 801 is applied to a cassette image pickup apparatus with a built-in battery, the present invention may adopt a configuration in which a drop in voltage supplied from the battery is detected.

Furthermore, as shown in FIG. 8, the present invention may include an auxiliary power supply 802 having electric power that allows the control unit 106 to perform at least the first to third processes and a power-supply selector switch 803 that switches power supply to the auxiliary power supply 802 when a drop in supply voltage is detected by the power monitoring unit 801. With such a configuration, even if supply of voltage from the external power supply 109 is suddenly stopped, the FPD 104 and the image pickup apparatus 100 can be reliably stopped without degrading the characteristics of the pixels.

Furthermore, as shown in FIG. 8, the image pickup apparatus 100 may have a temperature sensor 804 for monitoring the temperature in the image pickup apparatus 100 to determine whether the image pickup apparatus 100 is within a temperature range in which the image pickup apparatus 100 can normally acquire images. If the temperature sensor 704 senses that the image pickup apparatus 100 is out of the temperature range, then the temperature sensor 804 outputs information for the control unit 106 to perform the above-described first to third processes to the control unit 106. With such a configuration, if the interior of the image pickup apparatus 100 is at an abnormal temperature, the FPD 104 and the image pickup apparatus 100 can be reliably stopped without degrading the characteristics of the pixels. The cassette image pickup apparatus with a built-in battery may be configured to detect an increase in the temperature of the battery using the temperature sensor 804, and if the battery is at an abnormal temperature, to output information, such as a monitor signal, to the control unit 106.

Figure 9A:
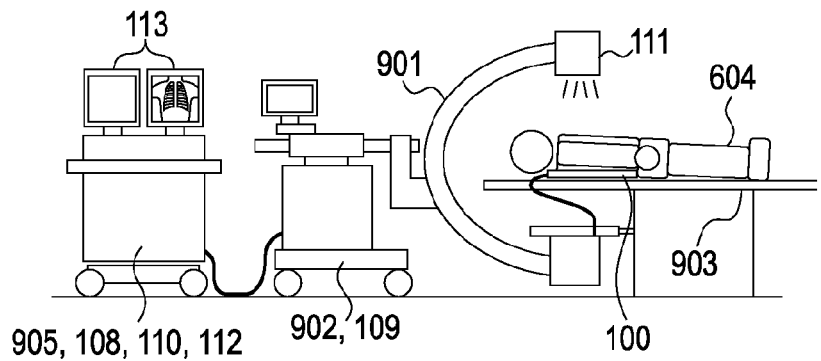
FIG. 9A is a conceptual diagram of a radiation image-pickup system including the image pickup apparatus, according to a third embodiment of the present invention.
Figure 9B:
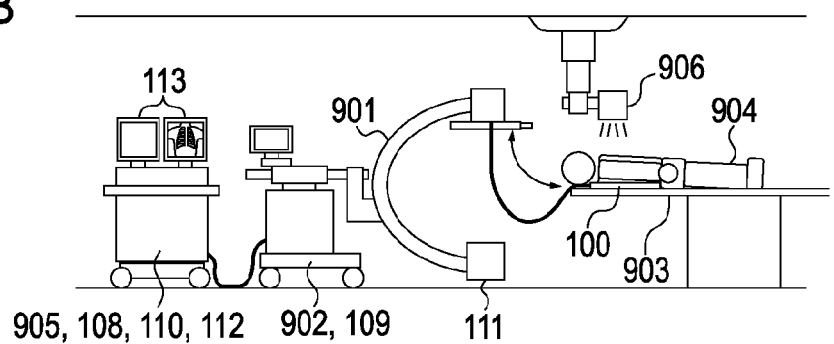
FIG. 9B is a conceptual diagram of a radiation image-pickup system including the image pickup apparatus, according to the third embodiment of the present invention.
Figure 9C:
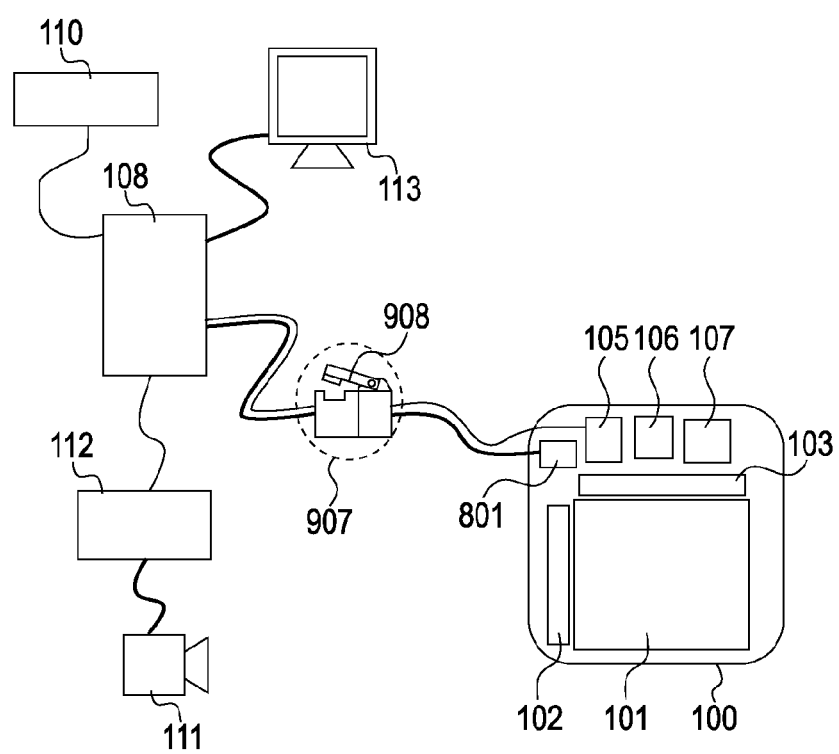
FIG. 9C is a conceptual block diagram of a radiation image-pickup system that can be applied to the systems shown in FIGS. 9A and 9B.

Next, FIGS. 9A to 9C show examples of application to a movable radiation image-pickup system as a third embodiment of the present invention. FIG. 9A is a conceptual diagram of a radiation image-pickup system including a transportable image pickup apparatus capable of radiation image pickup apparatus and still-image acquisition. FIG. 9A shows an example in which the image pickup apparatus 100 is removed from a C-shaped arm 901 and image acquisition is performed using a radiation generator 111 provided at the C-shaped arm 901. Here, the C-shaped arm 901 holds the radiation generator 111 and the image pickup apparatus 100. Reference numeral 113 denotes the display, shown in FIG. 1, on which image signals obtained by the image pickup apparatus 100 can be displayed, and reference numeral 903 denotes a bed on which a subject 904 is to be placed. Reference numeral 902 denotes a carriage that allows the radiation generator 111, the image pickup apparatus 100, and the C-shaped arm 901 to be moved, and reference numeral 905 denotes a mobile control unit with a configuration to control them. The carriage 902 accommodates the external power supply 109 shown in FIG. 1. The control unit 905 includes the control computer 108, the console 110, and the radiation-generator controller 112, shown in FIG. 1, and can also process the image signals obtained by the image pickup apparatus 100 and transmit the signals to the display 113 etc. The image data generated by the image process of the control unit 905 can be transferred to a remote location by transmission means, such as a telephone line. Thus, the image data can be displayed on a display or stored in storage means, such as an optical disc, in another location, such as a doctor room, thereby allowing diagnosis of a doctor at a remote location. The transferred image data can be recorded as a film using a film processor.

FIG. 9B shows a radiation image-pickup system including a transportable image pickup apparatus capable of radiation image pickup apparatus and still-image acquisition. FIG. 9B shows an example in which the image pickup apparatus 100 is removed from the C-shaped arm 901, and image acquisition is performed using a radiation generator 906 different from the radiation generator 111 mounted on the C-shaped arm 901.

FIG. 9C is a conceptual block diagram of a radiation image-pickup system that can be applied to the systems shown in FIGS. 9A and 9B. The radiation image-pickup system shown in FIG. 9C includes a detachable connector 907 that can disconnect the control computer 108, the power supply to the image pickup apparatus, 100, and transmission of control signals and image signals halfway therebetween. Disconnecting the cable at the detachable connector 907 prevents the cable from becoming tangles or twisted when the image pickup apparatus 100 is moved. With such a system, the operator may disconnect the detachable connector 907 during the operation of the image pickup apparatus 100. Thus, the detachable connector 907 is provided with a lever 908 for detecting the disconnection of the detachable connector 907, and when the lever 908 is raised, a control signal is transmitted to the control computer 108 and the control unit 106 to transmit that the detachable connector 907 was disconnected. On reception of the control signal indicating that the detachable connector 907 was disconnected, the control unit 106 performs the exit operation described in the foregoing embodiments to stop the image pickup apparatus 100. On the other hand, if the detachable connector 907 is instantly disconnected, electric power for stopping the image pickup apparatus 100 is not supplied. Thus, the control computer 108 instructs the operator to wait for disconnection by the detachable connector 907, using the display 113 or the like, until the exit operation of the image pickup apparatus 100 is completed into a stopped state. When the control computer 108 is notified that the above-described exit operation of the image pickup apparatus 100 is completed into the stopped state from the control unit 106, the control unit 106 gives an instruction to permit disconnection of the detachable connector 907 to the operator using the display 113 or the like. In this way, the image pickup apparatus 100 and the external power supply 109 can be reliably disconnected using the detachable connector 907 without significant degradation of the characteristics of the pixels. In the case where the image pickup apparatus 100 has the auxiliary power supply 802, as in FIG. 8, after the control signal indicating that the auxiliary power supply 802 was raised is given, the power supply may be switched to the auxiliary power supply 802. In this case, an instruction from the control computer 108 to the operator is not required.

The embodiments of the present invention can also be achieved by execution of programs by a computer in the control unit 106. Means for providing the program to the computer, for example, a computer-readable recording medium in which such programs are recorded, such as a CD-ROM, and a transmission medium for transmitting such programs, such as the Internet, can also be applied as embodiments of the present invention. The above-described programs can also be applied as an embodiment of the present invention. The programs, the recording medium, the transmission medium, and the program product are within the scope of the present invention. Possible combinations of the first and second embodiments should also be within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-324473 filed on Dec. 19, 2008, which is hereby incorporated by reference herein in its entirety.

What is claimed is:

1. An apparatus comprising:
   a detecting unit having a plurality of pixels that converts radiation or light to electric signals,
   a drive circuit configured to drive the detecting unit,
   a read circuit configured to output the electric signals as image signals,
   a power supply unit configured to perform voltage supply operations to supply voltages to the detecting unit, the drive circuit, and the read circuit, and
   a control unit configured to control at least the drive circuit and the power supply unit,
   wherein the control unit performs a first process of stopping the voltage supply operation to the detecting unit, with the voltage supply operations to the drive circuit and the read circuit maintained; a second process of driving the detecting unit using the power supply unit and the drive circuit after the first process; and a third process of stopping the voltage supply operations to the drive circuit and the read circuit after the second process.

2. The apparatus according to claim 1, wherein
   the apparatus is configured to be in a state in which voltages are applied by the power supply unit to a detector including the detecting unit, the drive circuit, and the read circuit, so that the image signals can be output from the detector.

3. The apparatus according to claim 2, wherein
the apparatus is further configured to be in a standby state in which supply of voltages from the power supply unit to the detecting unit, the drive circuit, and the read circuit is stopped, and
a stopped state in which supply of voltage to the power supply unit is stopped.

4. The apparatus according to claim 3, wherein
the control unit performs the first, second, and third processes to bring the apparatus from the state in which the image signals can be output to the standby state or to the stopped state.

5. The apparatus according to claim 1, wherein
the pixels each include a transducer that converts radiation or light to an electrical charge and a switching element that outputs a signal according to the electrical charge, in which one electrode of the transducer and a first main terminal of the switching element are connected.

6. The apparatus according to claim 5, wherein
the detecting unit includes a plurality of drive wires arrayed in a column direction and connected in common with control terminals of the switching elements of a plurality of pixels arrayed in a line direction among the plurality of pixels arrayed in a matrix form; and a plurality of signal wires arrayed in a line direction and connected in common with a second main terminal of a plurality of switching elements arrayed in a column direction,
the read circuit includes a reset unit configured to reset one of the signal wires, and
the control unit is configured to perform a process of bringing the signal wires into a reset state before the first process.

7. The apparatus according to claim 6, wherein the control unit performs a process of maintaining the signal wires in the reset state during the first and second processes.

8. The apparatus according to claim 6, wherein
the drive circuit supplies driving signals each having a conducting voltage that brings the switching elements into a conductive state and a non-conducting voltage that brings the switching elements into a non-conducting state to the plurality of drive wires individually; and
the control unit controls the drive circuit in the second process so that the driving signals are supplied such that the conducting voltages applied to the plurality of drive wires do not coincide.

9. The apparatus according to claim 6, wherein
the drive circuit supplies driving signals each having a conducting voltage that brings the switching elements into a conductive state and a non-conducting voltage that brings the switching elements into a non-conducting state to the plurality of drive wires individually, and
the control unit controls the drive circuit in the second process so that the driving signals are supplied such that the conducting voltages applied to the plurality of drive wires partly coincide.

10. The apparatus according to claim 6, wherein
the read circuit includes amplifying circuits for the individual signal wires, the amplifying circuits being provided in correspondence with the signal wires,
the amplifying circuits each include an integrating amplifier having an operational amplifier, an integral capacitance, and a reset switch serving as the reset unit configured to reset the signal wire and the integral capacitance; the operational amplifier, the integral capacitance, and the reset switch being connected to each of the signal wires,
the power supply unit includes a bias supply that supplies a bias voltage to the transducer and a reference supply that supplies a reference voltage to the operational amplifier, and
the apparatus further includes a unit configured to switch the voltage to be applied to the transducer by the control unit from the bias voltage to the reference voltage in the first process.

11. The apparatus according to claim 1, wherein the control unit performs the first to third processes on the basis of information given from the outside of the apparatus.

12. The apparatus according to claim 1, further comprising:
a power monitoring unit configured to monitor the voltage supplied to the power supply unit,
wherein the control unit performs the first, second, and third processes based on the information output from the power monitoring unit that has detected a decrease in the voltage supplied to the power supply unit.

13. The apparatus according to claim 12, further comprising:
a battery configured to supply voltage to the power supply unit,
wherein the control unit performs the first, second, and third processes based on the information output from the power monitoring unit that has detected a decrease in the voltage supplied from the battery to the power supply unit.

14. The apparatus according to claim 12, further comprising:
an auxiliary power supply having electric power that allows the first, second, and third processes to be performed,
wherein the control unit switches the power supply to the auxiliary power supply based on the information output from the power monitoring unit that has detected a decrease in the voltage supplied to the power supply unit.

15. A system comprising:
the apparatus according to claim 1; and
a control computer that performs control of the apparatus and image processing of image signals obtained by the apparatus.

* * * * *